W. Fuzzard.
Making Wadding.

No. 1,649. Reissued Apr. 5, 1864

Witnesses:
J. W. Coombs
G. W. Reed

Inventor:
Wm. Fuzzard,
per Munn & Co
Attorneys

UNITED STATES PATENT OFFICE.

WILLIAM FUZZARD AND JAMES HATCH, OF MALDEN, MASSACHUSETTS
ASSIGNEES OF SAID WILLIAM FUZZARD.

IMPROVEMENT IN MACHINES FOR SURFACE-SIZING FIBROUS MATERIAL.

Specification forming part of Letters Patent No. 41,214, dated January 12, 1864; Reissue No. 1,649, dated April 5, 1864.

*To all whom it may concern:*

Be it known that we, WILLIAM FUZZARD and JAMES HATCH, both of Malden, in the county of Middlesex and State of Massachusetts, do hereby declare that WILLIAM FUZZARD, one of the parties aforesaid, did obtain Letters Patent of the United States, dated January 12, 1864, for Surfacing Fibrous Materials, and that by virtue of an assignment, duly recorded in the Patent Office, all the right, title, or interest in said Letters Patent have now become vested in us—to wit, WILLIAM FUZZARD and JAMES HATCH; and that for the purpose of obtaining a reissue we do hereby declare that the following is a full, clear, and exact description of the same, reference being had to the accompanying drawings, making a part of this specification, in which—

Figure 1:
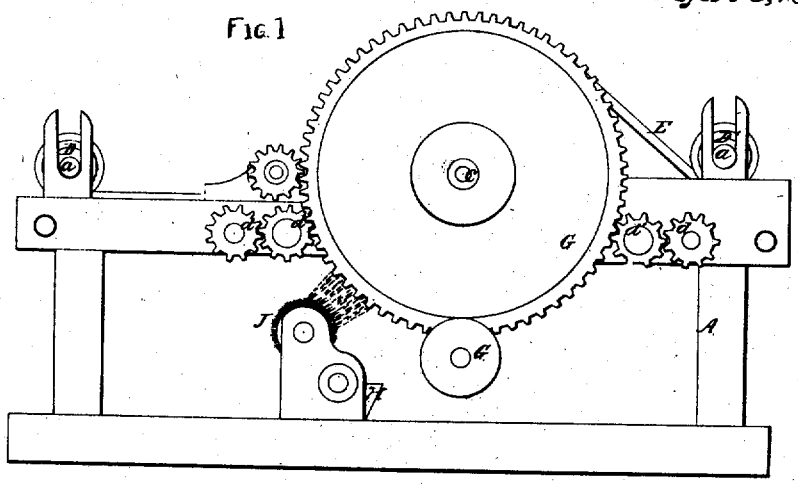
Figure 2:
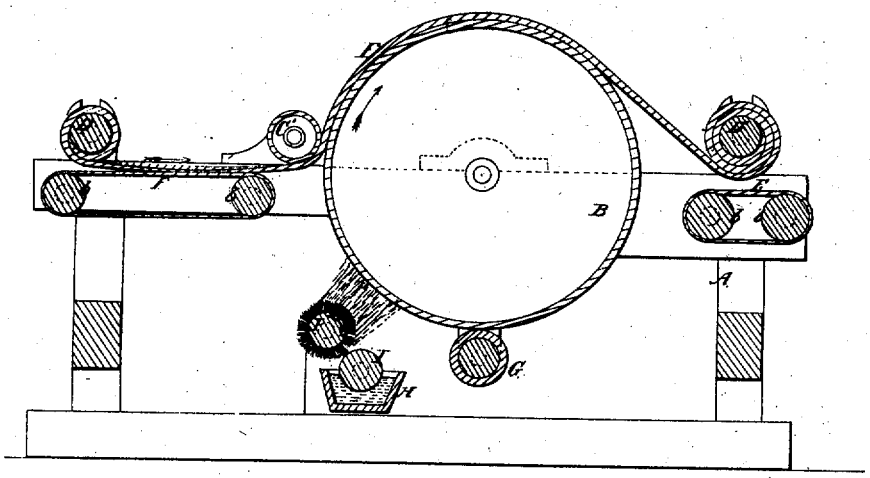

Figure 1 is a side view of the invention; Fig. 2, a longitudinal vertical section of the same, taken through the center.

Similar letters of reference indicate corresponding parts in the two figures.

This invention relates to machinery for applying a glazing or size to fibrous substances—such as cotton wadding, &c.—in such a manner that a quite thin or attenuated sizing may be used and applied to the web or material to be glazed, sized, or "surfaced," as it is technically termed, and said material dried at the same operation.

To this end the invention consists in the employment or use of a smooth or polished metal cylinder, heated by steam or otherwise, over a portion of which the web to be surfaced passes, and of a heated pressure roller bearing against the web upon the metal cylinder, the cylinder or the web having the glazing or size previously distributed upon it by means of a revolving brush or its equivalent, as hereinafter set forth.

To enable those skilled in the art to fully understand and construct the invention, we will proceed to describe it.

A represents a framing, which may be constructed in any proper manner, to support the working parts of the machine; and B is a cylinder, the shaft of which is fitted transversely in the framing A. This cylinder is of metal, or has a metallic exterior, as smooth as possible, and is heated by steam passing within it or by other suitable means.

C is a small metal cylinder placed on the framing A, and within a short distance of the cylinder B, and D D′ are two rollers, the journals *a* of which are fitted in slotted uprights in the framing. The web to be surfaced (which is designated by E) passes off from the roller D and is wound upon the roller D′, the web passing between the small metal cylinder C and the large cylinder B and over the upper part of the same, as shown clearly in Fig. 2.

F F are two endless aprons, which are placed at each end of the framing A. The aprons work over suitable rollers, *b*, which are rotated from a toothed wheel, G, on one end of the shaft *c* of the large cylinder B through the medium of pinions *d d′*, the former being attached to one end of the aprons F F. (See Fig. 1.)

G represents a roller, which is covered with felt or other suitable material which will polish or clean the cylinder B. This roller is so placed as to run in contact with the periphery of the cylinder B directly underneath its shaft.

H is a trough, which contains the glazing or size, and in which a roller, I, is fitted longitudinally, and works or rotates in a partially-submerged state in the glazing or size, as shown in Fig. 2.

J is a brush-roller, which works in contact with the roller I. The brush-roller is some distance from the periphery of the cylinder B. The roller I may be of metal—at least that would be the most preferable material for its surface or periphery, as the latter should be smooth. The roller I, brush-roller J, and felt roller G may be rotated by belts or gearing arranged in any suitable way. The glazing or sizing in the trough H is quite thin, dissolved or attenuated in water so as to be like starch that is commonly used in sizing cotton goods. The roller I, as it rotates, brings up on its surface a quantity of the glazing or sizing, which is wiped off by the brush-roller J, the latter rotating very rapidly and throwing the glazing or sizing in very fine particles, like mist, against the cylinder B. The brush-roller J acts in rather a peculiar manner in throwing the sizing on the cylinder. Bristles, as is well known, possess considerable elasticity, and as they come in contact with the roller I they are slightly bent back, and when they pass the roller, in consequence of their elasticity, they throw the sizing on the cylinder in a thin sheet. The cylinder is heated to such a degree that evaporation commences the instant the glazing or sizing touches the cylinder B, and the former is partially dried before it comes in contact with the web E at the point between the cylinder C and the cylinder B. The cylinder C, being also heated, dries off the steam that passes through the web at this point, and the web in passing over the upper part of the cylinder B is glazed or sized and dried, the two processes being performed simultaneously and finished before the web reaches the point *a**, where it leaves the cylinder B. The cylinder C also presses the web E to the cylinder B, and causes it to adhere to the glazing or sizing on cylinder B. One or more of these cylinders C may be used. The web E, being thus pressed on the glazing or sizing, and moving with it on the hot cylinder B, becomes, as previously stated, dry before or as it reaches its point of discharge from the cylinder B, the web taking off with it from said cylinder the fine glazing. To accomplish this result in a perfect manner the cylinder B requires to be well polished or cleaned, which is done by the felt roller G, the latter revolving rapidly. A little beeswax or tallow may be occasionally rubbed on cylinder B to aid the cleaning process. Thus it will be seen that by this simple arrangement a liquid or semi-liquid glazing or sizing may be applied to the web, and the latter surfaced and dried expeditiously at one and the same operation and by a very compact device.

We would remark that in cases where the web is made of a long and strong fiber it is possible and practicable to throw the glazing or sizing directly on the web, and the latter may pass over the cylinder B in the same way as previously described; or any suitable arrangement or means may be employed to pass the web along to receive the sizing from the brush.

Having thus described the invention, what we claim as new, and desire to secure by Letters Patent, is—

1. The employment or use of a heated metallic cylinder, B, or one having a metallic exterior or periphery, in combination with a heated pressure-cylinder, C, (one or more,) and a polishing-roller, G, or its equivalent, arranged as shown, for the purpose of surfacing and drying simultaneously or at one operation fibrous materials, as set forth.

2. The distributing or throwing of the glazing or sizing upon or against the cylinder, or upon or against a web without a cylinder, by means of a brush, substantially as set forth.

WILLIAM FUZZARD.
JAMES HATCH.

Witnesses:
SAML. S. DAVIS,
WALTER FLETCHER.